(12) United States Patent
Oh et al.

(10) Patent No.: US 7,363,010 B2
(45) Date of Patent: Apr. 22, 2008

(54) POWER CONTROL FOR INTERMITTENTLY ACTIVE DATA CHANNELS IN A WIRELESS COMMUNICATION SYSTEM

(75) Inventors: Hyukjun Oh, Santa Clara, CA (US); Parvathanathan Subrahmanya, Sunnyvale, CA (US); Nitin Kasturi, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 763 days.

(21) Appl. No.: 10/827,143

(22) Filed: Apr. 15, 2004

(65) Prior Publication Data
US 2005/0239409 A1    Oct. 27, 2005

(51) Int. Cl.
*H04B 17/00* (2006.01)
(52) U.S. Cl. .................. 455/67.11; 455/522; 455/69
(58) Field of Classification Search ............. 455/67.11, 455/522, 69, 232, 240.1, 245.1, 434, 450, 455/13.4, 70, 67.13; 375/130, 147
See application file for complete search history.

(56) References Cited

U.S. PATENT DOCUMENTS

| | | | |
|---|---|---|---|
| 6,615,052 B1 * | 9/2003 | Parmenter ................. | 455/522 |
| 6,639,934 B1 * | 10/2003 | Engstrom et al. ........... | 375/130 |
| 2003/0003875 A1 * | 1/2003 | Oestreich ..................... | 455/69 |
| 2003/0125037 A1 * | 7/2003 | Bae et al. .................... | 455/450 |
| 2003/0143959 A1 * | 7/2003 | Harris et al. ................. | 455/77 |
| 2004/0087306 A1 * | 5/2004 | Moulsley et al. ............ | 455/434 |

FOREIGN PATENT DOCUMENTS

| WO | 03017527 | 2/2003 |
|---|---|---|
| WO | 03021976 | 3/2003 |

\* cited by examiner

*Primary Examiner*—Tan Trinh
(74) *Attorney, Agent, or Firm*—George C. Pappas; Eric Ho; Thomas Rouse (57) ABSTRACT

Techniques for controlling transmit power for a data transmission sent on multiple data channels, which may be intermittently active, are described. Each data channel is monitored for activity (e.g., based on an error correction code, received signaling information, received block energy, and so on) and deemed to be dormant or not dormant (e.g., based on the amount of elapsed time since activity was last detected on the data channel). A signal quality (SIR) target may be maintained for each non-dormant data channel and updated based on the status of received data blocks for the data channel. A final SIR target, used for power control of the data transmission, may be set to the highest SIR target among the SIR targets for the non-dormant data channels. The final SIR target may also be updated directly based on the status of received data blocks for the non-dormant data channels.

28 Claims, 8 Drawing Sheets

| Transport Channel | SIR Target | $\Delta DN_i$ | Dormant Flag | Inactive Time | Last SIR Target |
|---|---|---|---|---|---|
| 1 | 0.7 | 0.1 | F | 3 | - |
| 2 | - | 0.05 | T | 11 | 2.5 |
| ... | ... | ... | ... | ... | ... |
| N | 3.5 | 0.05 | F | 1 | - |

POWER CONTROL FOR INTERMITTENTLY ACTIVE DATA CHANNELS IN A WIRELESS COMMUNICATION SYSTEM

BACKGROUND

I. Field

The present invention relates generally to communication, and more specifically to techniques for controlling the transmit power of a data transmission sent on multiple data channels in a wireless communication system.

II. Background

In a wireless communication system, a wireless device (e.g., a cellular phone) communicates with one or more base stations via transmissions on the downlink and uplink. The downlink (or forward link) refers to the communication link from the base station to the wireless device, and the uplink (or reverse link) refers to the communication link from the wireless device to the base station. In a Code Division Multiple Access (CDMA) system, a base station may transmit data to multiple wireless devices simultaneously. The total transmit power available at the base station thus determines the downlink capacity of the base station. A portion of the total available transmit power is allocated to each active wireless device such that the aggregate transmit power used for all active wireless devices is less than or equal to the total available transmit power.

To maximize downlink capacity, a power control mechanism is typically used for each wireless device. The power control mechanism is normally implemented with two power control loops, which are often called an "inner" loop and an "outer" loop. The inner loop adjusts the transmit power used for the wireless device such that the received signal quality for a downlink data transmission, as measured at the wireless device, is maintained at a target value. The signal quality (denoted as SIR) may be quantified by a signal-to-noise-plus-interference ratio or some other quantity, and the target value may be called an SIR target. The outer loop adjusts the SIR target to achieve the desired level of performance, which may be quantified by a block error rate (BLER) target or some other performance measurement. The wireless device consumes too much system capacity if the BLER is too low and provides unsatisfactory performance if the BLER is too high. By minimizing the amount of transmit power used for the wireless device while maintaining the BLER target, improved utilization of the system capacity and reduced delays in serving wireless users may be achieved.

A Wideband CDMA (W-CDMA) system supports data transmission on one or more "transport" channels to a wireless device. A transport channel may be viewed as a data channel or a data/message bearer. Each transport channel is associated with one or more transport formats, and each transport format specifies various processing parameters for that transport channel. A BLER target may also be specified for each transport channel. Each transport channel may require a different SIR target, which is dependent on various factors such as the BLER target and the transport formats used for that transport channel and the wireless channel condition. Data to be sent on the transport channels are multiplexed onto a "physical" channel. The transmit power for the physical channel (and not the individual transport channels) is adjusted through power control. Power control for a single physical channel carrying multiple transport channels with different SIR targets is challenging, especially if one or more of these transport channels are intermittently active or inactive for an extended period of time.

There is therefore a need in the art for techniques to control the transmit power for multiple data channels power controlled together, where one or more of the data channels may be intermittently active.

SUMMARY

Techniques for controlling the transmit power for a data transmission sent on multiple data channels, which may be intermittently active, are described herein. Each data channel is monitored to detect for activity on the data channel. Activity may be detected based on an error detection code used for each data block sent on a data channel, received signaling information that indicates whether or not data blocks are sent on the data channel, energy of received blocks for the data channel, and so on. Each data channel is deemed to be dormant or not dormant, for example, based on the amount of time that has elapsed since activity was last detected on the data channel. In an embodiment, an SIR target is maintained for each data channel that is not dormant, and this SIR target is updated based on the status of received data blocks for the data channel. A final SIR target, which is used for power control of the data transmission, is then set to the highest SIR target among the SIR targets for the data channels that are not dormant. In another embodiment, the final SIR target for the physical channel is updated based on the status of received data blocks for non-dormant data channels. For both embodiments, only non-dormant data channels are considered in deriving the final SIR target.

Whenever a given data channel i goes dormant, a last SIR target value may be saved for the data channel. This last SIR target value may be either the SIR target for data channel i or the final SIR target at the time data channel i goes dormant. When data channel i goes dormant, the SIR targets for other non-dormant data channels may be reset to the final SIR target at this time. This may be done so that the performance of these non-dormant data channels is not degraded if the SIR target for data channel i was used as the final SIR target, and is no longer used because data channel i is now dormant. When data channel i comes out of dormancy (e.g., due to detected activity on the data channel), the SIR target for data channel i may be re-initialized to either the last SIR target value or the final SIR target at the time that data channel i comes out of dormancy.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
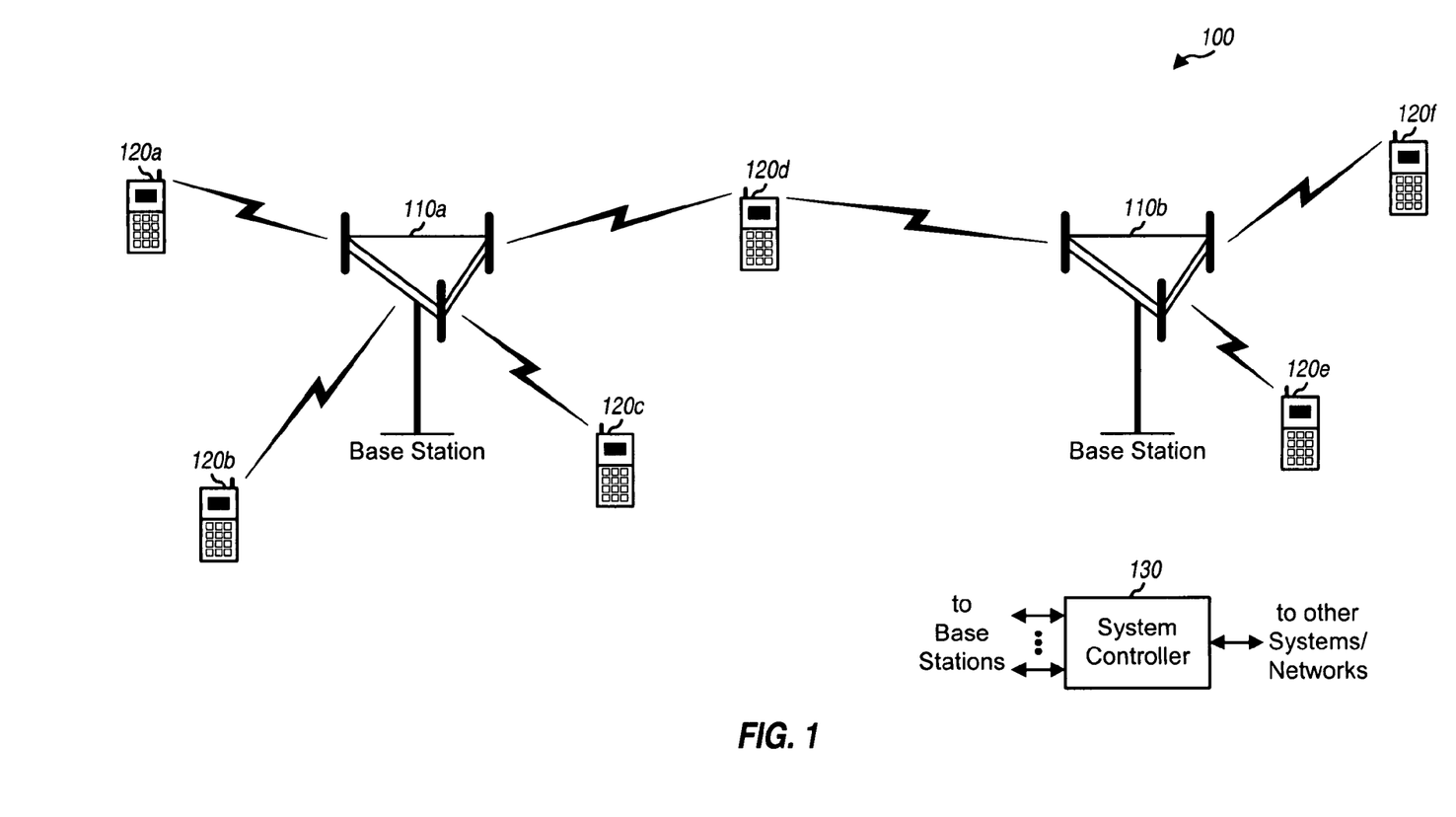
FIG. 1 shows a wireless communication system.

FIG. 1 shows a wireless communication system 100. Each base station 110 in system 100 provides communication coverage for a respective geographic area. A base station is a fixed station and may also be referred to as a Node B, a base transceiver subsystem (BTS), an access point, or some other terminology. Wireless devices 120 are typically dispersed throughout system 100. A wireless device may be fixed or mobile and may also be referred to as a user equipment (UE), a mobile station, a terminal, or some other terminology. A wireless device may communicate with one or multiple base stations on the downlink and/or one or multiple base stations on the uplink at any given moment. A system controller 130 couples to base stations 110 and may further couple to other systems and networks, such as a public switched telephone network (PSTN), a packet data serving node (PDSN), and so on. System controller 130 provides coordination and control for the base stations coupled to it and further controls the routing of data to/from the wireless devices served by these base stations. System controller 130 may also be referred to as a radio network controller (RNC), a base station controller (BSC), or some other terminology.

System 100 may be a CDMA system that may implement one or more CDMA standards such as W-CDMA, IS-2000, IS-856, IS-95, and so on. System 100 may also be a Time Division Multiple Access (TDMA) system that may implement one or more TDMA standards such as Global System for Mobile Communications (GSM). These standards are well known in the art.

The power control techniques described herein may be used for any wireless communication system that transmits data on multiple data channels and performs closed-loop power control for the data transmission sent on these data channels. As used herein, a data channel is a bearer of data/messages, and may also be referred to as a transport channel, a traffic channel, a code channel, or some other terminology. These techniques may also be used for power control on the downlink as well as the uplink. For clarity, these techniques are specifically described below for downlink power control in a W-CDMA system and using W-CDMA terminology (e.g., transport channel, physical channel, transport block, SIR target, BLER target, and so on).

In W-CDMA, a base station transmits data and signaling to a wireless device using one or more logical channels at a Radio Link Control (RLC) layer. The logical channels commonly used for data transmission include a dedicated traffic channel (DTCH) and a dedicated control channel (DCCH). The logical channels are mapped to transport channels at a Medium Access Control (MAC) layer. The transport channels may carry data for one or more services (e.g., voice, video, packet data, and so on), and each transport channel may be coded separately. The transport channels are further mapped to physical channels at a physical layer. The channel structure for W-CDMA is described in a document 3GPP TS 25.211, which is publicly available.

Each transport channel (TrCh) in W-CDMA is associated with a transport format set that includes one or more transport formats that may be used for that transport channel. The transport format set for each transport channel may be selected/configured during call setup. Each transport format specifies various processing parameters such as (1) a transmission time interval (TTI) over which the transport format applies, (2) the size of each block of data (or transport block), (3) the number of transport blocks for each TTI, (4) the length of each code block, (5) the coding scheme to use for the TTI, and so on. Only one TTI is used for each transport channel, and this TTI may span one, two, four, or eight frames. A frame is a time duration of 10 msec in W-CDMA. A BLER target may also be specified for each transport channel, which allows different transport channels to achieve different levels of quality of service (QoS). Each transport channel may require a different SIR target, which is dependent on the BLER target and the transport format(s) used for that transport channel.

A set of transport channels is used for each call in W-CDMA. Different sets of transport channels may be used for different types of call (e.g., packet data, voice, and so on) and for different calls of the same type. For example, a packet data call may be assigned two transport channels— one transport channel to carry the DTCH for packet data and another transport channel to carry the DCCH for control data. As another example, a voice call may be assigned four transport channels—three transport channels to carry three classes of speech data (Classes A, B, and C) generated by an adaptive multi-rate (AMR) speech encoder used for the voice call and one transport channel to carry the DCCH for control data. Each transport channel may be an instance of a dedicated transport channel (DCH).

Figure 2:
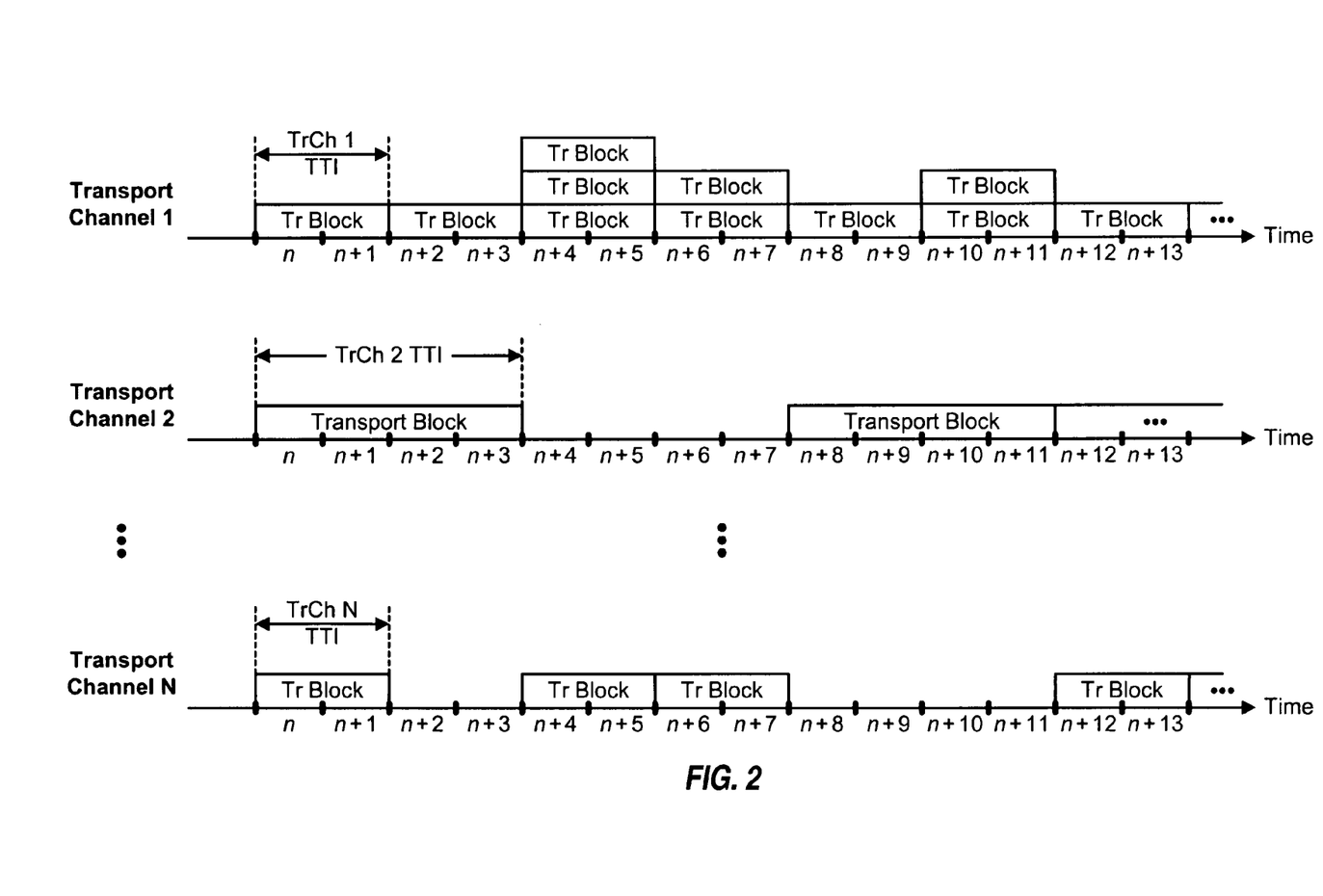
FIG. 2 shows multiple transport channels used for a call in W-CDMA.

FIG. 2 shows a set of N transport channels used for an exemplary call, where N>1. Transport channels 1 through N−1 may carry different types of data for the call, which may be processed as N−1 different subflows for a DTCH at the RLC layer. Transport channel N may carry control data for the call, which may be processed as a DCCH at the RLC layer. For the example shown in FIG. 2, transport channel 1 has a TTI of two frames, transport channel 2 has a TTI of four frames, and so on, and transport channel N has a TTI of two frames. Transport channel 1 can carry different numbers of transport blocks in different TTIs and may be used to support multiple services on a single transport channel. Transport channel 2 carries one transport block in each TTI and may be used for voice service or some other variable rate service.

Each transport channel may be continuously active or intermittently active. A continuously active transport channel is one in which at least one transport block is sent on the transport channel in each TTI. An intermittently active transport channel is one that has discontinuous transmission (DTX) so that a transport block may or may not be sent on the transport channel in any given TTI. No transport blocks are sent on the transport channel during periods of no transmission, and the non-transmitted blocks are called DTX blocks. A transport channel is active in a given TTI if at least one transport block is sent on the transport channel in that TTI and inactive if no transport blocks are sent.

In W-CDMA, a downlink DPCH is typically assigned to each wireless device for the duration of a call. The downlink DPCH is characterized by the possibility of fast data rate change (e.g., every 10 msec frame), fast power control, and inherent addressing to a specific wireless device.

Figure 3:
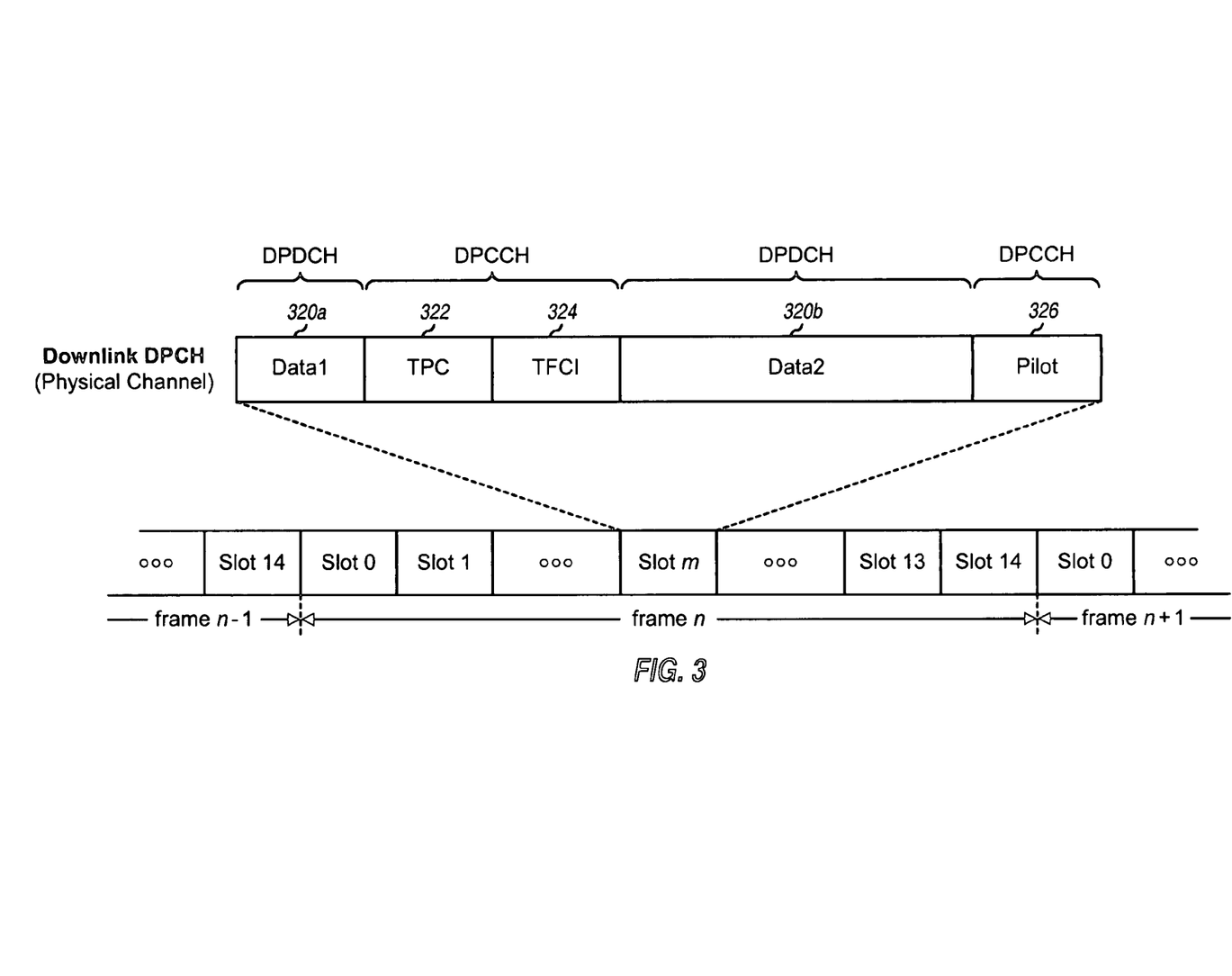
FIG. 3 shows the format for a downlink dedicated physical channel (downlink DPCH) in W-CDMA.

FIG. 3 shows the format for the downlink DPCH in W-CDMA. The downlink DPCH is composed of a downlink dedicated physical data channel (DPDCH) and a downlink dedicated physical control channel (DPCCH), which are time division multiplexed. The DPDCH carries transport channel data, and the DPCCH carries control data (or signaling information) for the physical layer. Data is transmitted on the downnlink DPCH in radio frames. Each radio frame is sent over a 10 msec frame, which is divided into 15 slots. Each slot is partitioned into data fields 320a and 320b (Data1 and Data2), a transmit power control (TPC) field 322, a transport format combination indicator (TFCI) field 324, and a pilot field 326.

Data fields 320a and 320b carry transport channel data for all active transport channels. If the TTI for a given transport channel is longer than one frame, then each transport block for that transport channel is segmented onto multiple subblocks, with each subblock being sent in one frame. For each frame, the subblocks to be sent in that frame for all active transport channels are multiplexed into a coded composite transport channel (CCTrCH). The CCTrCH is further processed and transmitted on the DPDCH in one frame.

TFCI field 324 carries transport format information, which indicates the transport formats used for the transport channels carried by the downlink DPCH in the current frame. The wireless device uses the transport format information to process (e.g., decode) the transport blocks sent on the transport channels. The base station may elect to omit (not send) the transport format information. In this case, the wireless device performs blind transport format detection (BTFD) and processes each received block for each transport channel in accordance with each of the possible transport formats for that transport channel. The wireless device uses a cyclic redundancy check (CRC) value, if any, included in the transport block to aid with the BTFD.

TPC field 322 carries a TPC command for uplink power control. This TPC command directs the wireless device to adjust its uplink transmit power either up or down to achieve the desired uplink performance. Pilot field 326 carries a dedicated pilot for the wireless device. The duration of each field is determined by the slot format used for the downlink DPCH.

Figure 4:
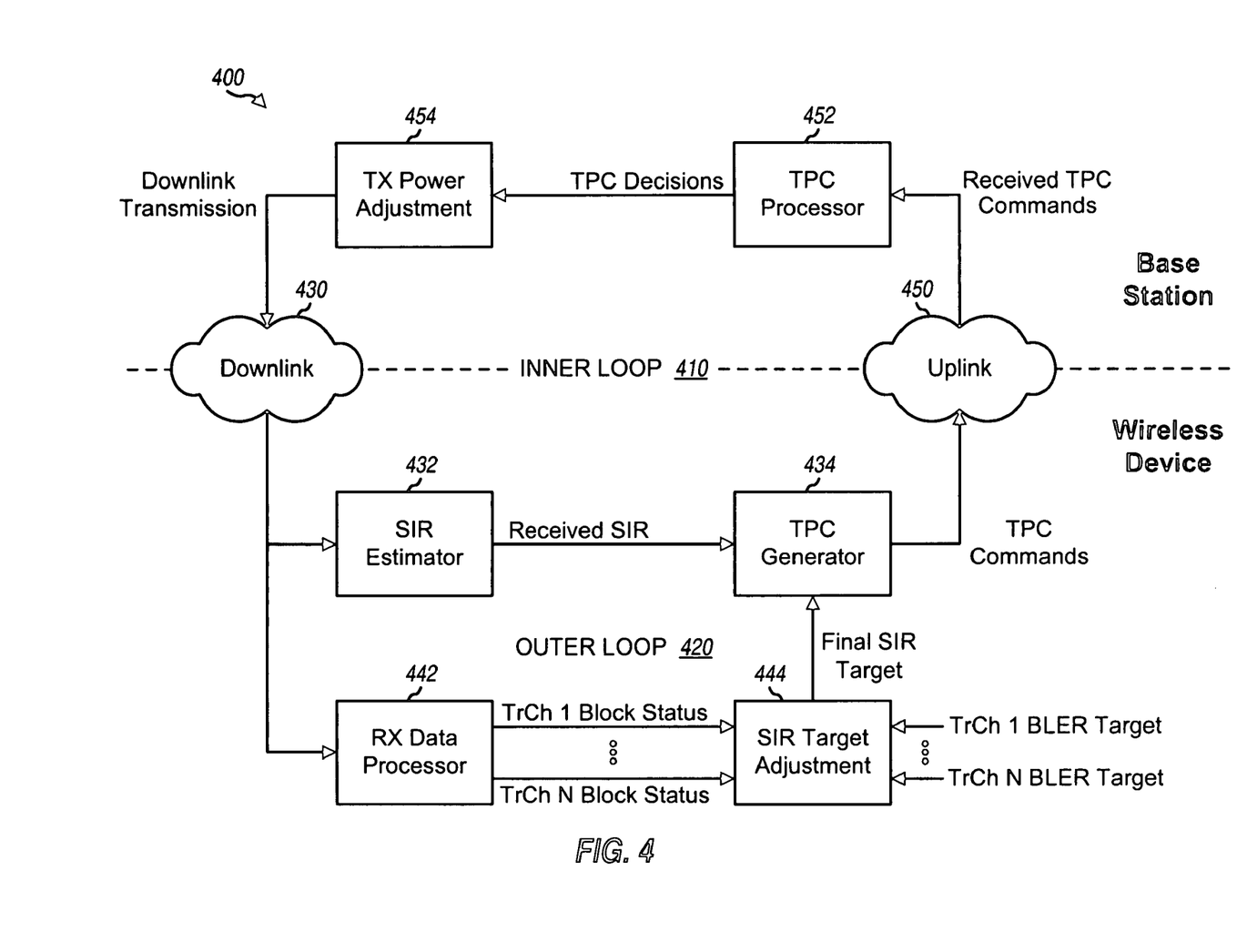
FIG. 4 shows a power control mechanism.

FIG. 4 shows a power control mechanism 400 that may be used to control the transmit power for a downlink data transmission sent on multiple transport channels carried by a physical channel. Power control mechanism 400 includes an inner loop 410 and an outer loop 420.

Inner loop 410 maintains the received SIR for the downlink transmission, as measured at the wireless device, as close as possible to the final SIR target for the physical channel. For inner loop 410, an SIR estimator 432 estimates the received SIR for the downlink transmission (e.g., based on the dedicated pilot in Pilot field 326 in FIG. 3) and provides the received SIR to a TPC generator 434. TPC generator 434 also receives the final SIR target for the physical channel, compares the received SIR against the final SIR target, and generates a TPC command based on the comparison result. The TPC command is either an UP command to direct an increase in transmit power for the downlink transmission or a DOWN command to direct a decrease in transmit power. One TPC command is generated for each slot in W-CDMA and is sent on the uplink (cloud 450) to the base station. TPC commands may be sent as often as 1500 times per second, thereby providing a relatively fast response time for inner loop 410.

The base station processes the uplink transmission from the wireless device and obtains a received TPC command for each slot. The received TPC command is a noisy version of the TPC command sent by the wireless device. A TPC processor 452 detects each received TPC command and provides a TPC decision, which indicates whether an UP command or a DOWN command was detected. A transmit (TX) power adjustment unit 454 then adjusts the transmit power for the downlink transmission based on the TPC decision.

Due to path loss, fading, and multipath effects on the downlink (cloud 430), which typically vary over time and especially for a mobile wireless device, the received SIR at the wireless device continually fluctuates. Inner loop 410 attempts to maintain the received SIR at or near the final SIR target in the presence of changes in the downlink channel condition. Outer loop 420 continually adjusts the final SIR target such that the BLER target or better is achieved for each transport channel carried by the physical channel.

For each transport channel, a receive (RX) data processor 442 processes and decodes each received block for the transport channel to obtain a decoded block, and further checks each decoded block to determine the status of the received block. A received block (or received data block) is a block of data received on a transport channel and may be for a transmitted transport block or a DTX block. The block status indicates whether the received block is (1) a good block, which is a transport block that is transmitted and decoded correctly, (2) an erased block, which is a transport block that is transmitted but decoded in error, or (3) a DTX block, which is a non-transmitted block. RX data processor 442 typically first checks each decoded block based on a CRC value for the block to determine whether the decoded block is a good block (CRC success) or not a good block (CRC failure). For each decoded block with CRC failure and an unknown transport format, RX data processor 442 next determines whether the decoded block is an erased block or a DTX block based on one or more metrics such as, for example, the energy of the received block, a symbol error rate (SER) for the received block, and so on. RX data processor 442 provides the status of each decoded block for each transport channel.

An SIR target adjustment unit 444 receives the block status and the BLER target for each transport channel carried by the physical channel and determines the final SIR target for the physical channel. Adjustment unit 444 may derive the final SIR target as described below.

The final SIR target for the physical channel may be obtained in various manners. In a first embodiment, a separate SIR target is maintained for each transport channel that is not dormant, and this SIR target is updated based on the status of received data blocks for the transport channel. The final SIR target for the physical channel is then set to the highest SIR target among the SIR targets for the non-dormant transport channels. In a second embodiment, the final SIR target for the physical channel is updated directly based on the status of received data blocks for the non-dormant data channels, and separate SIR targets are not maintained for the non-dormant transport channels. For clarity, the first embodiment is described in detail below.

A transport channel may be deemed to be dormant or not dormant based on various criteria. As some examples, a transport channel may be deemed to be dormant if (1) no activity has been detected on the transport channel for a predetermined amount of time or (2) the SIR target for the transport channel has not been adjusted for a predetermined time period. In any case, dormant transport channels are not considered in deriving the final SIR target for the physical channel.

Each transport channel may be monitored to detect for activity on the transport channel and to determine if the transport channel is dormant or not dormant. Activity on a transport channel may be detected in various manners. In one embodiment, activity is detected based on the CRC or some other error detection code. A transport channel may be deemed to have no activity in a given TTI if a good block (with CRC success) is not received on the transport channel in that TTI. In another embodiment, activity is detected based on transport format information sent in the TFCI field. A transport channel may be deemed to have no activity in a given TTI if the received transport format information indicates that the transport channel is not being carried on the physical channel in that TTI. In yet another embodiment, activity is detected based on received block energy. A transport channel may be deemed to have no activity in a given TTI if the energy of a received block for the transport channel in that TTI is less than a predetermined energy threshold. Other criteria may also be used to determine whether or not there is activity on a transport channel.

The CRC and received block energy can provide an indication of whether a transport channel is active or inactive at the end of each TTI for the transport channel. This is because the CRC and received block energy are determined after an entire block has been received. The transport format information can provide an indication of whether a transport channel is active or inactive earlier in the TTI since this information is transmitted concurrently with the transport blocks sent on each transport channel. The earlier detection of activity on a transport channel allows the transport channel to be considered for power control earlier, which may improve performance.

The SIR target for each transport channel may be adjusted based on the received blocks and the BLER target for that transport channel. Each transport channel may be associated with an up step size $\Delta UP_i$ and a down step size $\Delta DN_i$ used to achieve the BLER target for that transport channel. The up and down step sizes for each transport channel may be expressed as:

$$\Delta DN_i = \Delta UP_i \cdot \left( \frac{BLER_{target,i}}{1 - BLER_{target,i}} \right), \text{ for } i \in I, \quad \text{Eq (1)}$$

where
i is an index for the transport channels;
I is the set of all transport channels carried by the physical channel;
$BLER_{target, i}$ is the BLER target for transport channel i;
$\Delta UP_i$ is the up step size for transport channel i; and
$\Delta DN_i$ is the down step size for transport channel i.

For example, if the BLER target for a given transport channel is 1%, then the up step size is 99 times the down step size. If the up step size is 0.5 decibel (dB), then the down step size is approximately 0.005 dB. In an embodiment, the same up step size $\Delta UP$ is used for all transport channels, and the down step size for each transport channel is determined by the common up step size and the BLER target for the transport channel.

The SIR target for each transport channel may be adjusted in each update interval, which may be the shortest TTI for all of the transport channels carried by the physical channel or some other time duration. The SIR target for each transport channel may be increased by the up step size if at least one erased block was received on the transport channel in the current update interval, as follows:

$$SIR_{target, i}(k+1) = SIR_{target, i}(k) + \Delta UP \cdot NB_{erased, i}(k), \quad \text{Eq (2a)}$$

where
k is an index for the update interval;
$NB_{erased, i}(k)$ is the number of erased blocks received on transport channel i in update interval k;
$SIR_{target, i}(k)$ is the SIR target for transport channel i for update interval k; and
$SIR_{target, i}(k+1)$ is the SIR target for transport channel i for update interval k+1.

Alternatively, the SIR target for each transport channel may be increased as follows:

$$SIR_{target, i}(k+1) = SIR_{target, i}(k) + \Delta UP. \quad \text{Eq (2b)}$$

In equation (2b), the SIR target is increased by the up step size for each TTI in which at least one erased block is received on the transport channel, regardless of the number of erased blocks received in the TTI.

The SIR target for each transport channel may be decreased by the down step size if at least one good block and no erased blocks have been received on the transport channel in the current update interval, as follows:

$$SIR_{target, i}(k+1) = SIR_{target, i}(k) - \Delta DN_i \cdot NB_{good, i}(k), \quad \text{Eq (3a)}$$

where $NB_{good, i}(k)$ is the number of good blocks received on transport channel i in update interval k. Alternatively, the SIR target for each transport channel may be decreased as follows:

$$SIR_{target, i}(k+1) = SIR_{target, i}(k) - \Delta DN_i. \quad \text{Eq (3a)}$$

In equation (3b), the SIR target is decreased by the down step size for each TTI in which at least one good block and no erased blocks are received on the transport channel, regardless of the number of good blocks received in the TTI. The SIR target for each transport channel may be maintained if no blocks or only DTX blocks are received on the transport channel in the current update interval. For example, if the TTI for a transport channel is 8 frames and the update interval is every two frames, then the SIR target for this transport channel is updated every fourth update interval. The SIR target for each non-dormant transport channel is updated in each update interval. The SIR targets for dormant transport channels may or may not be updated.

The final SIR target for the physical channel may be derived based on the SIR targets for the non-dormant transport channels, as follows:

$$SIR_{\text{final\_target}}(k+1) = \max_{i \in J} \{SIR_{target,i}(k+1)\}, \quad \text{Eq (4)}$$

where
J is a set of all non-dormant transport channels in the current update interval; and
$SIR_{\text{final\_target}}(k+1)$ is the final SIR target for update interval k+1.

Setting the final SIR target to the highest SIR target for the non-dormant transport channels in set J ensures that the SIR target or better is achieved for each non-dormant transport channel. In general, set J contains all transport channels used to derive the final SIR target. Set J may also be defined in other manners.

Figure 5:
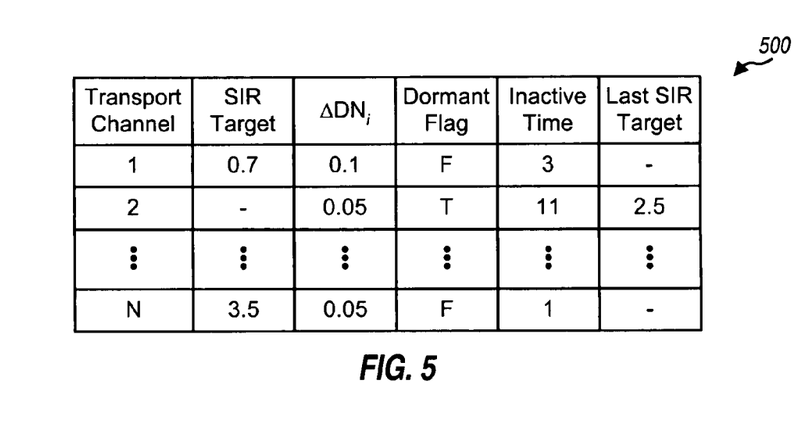
FIG. 5 shows a table maintained for the transport channels for power control.

FIG. 5 shows a table 500 that may be maintained for the transport channels for power control. Table 500 includes one row or entry for each transport channel carried by the physical channel. The first column of table 500 stores the identifier for each transport channel. The second column stores the current SIR target for each transport channel, which may be updated as described above. The third column stores the down step size $\Delta DN_i$ for each transport channel, which may be determined as shown in equation (1). The fourth column stores a dormant flag for each transport channel, which is set to 'True' (T) if the transport channel is dormant and to 'False' (F) if the transport channel is not dormant. The fifth column stores the inactivity duration or inactive time for each transport channel, which is the amount of time that has elapsed since activity was last detected on the transport channel. The sixth column stores a last SIR target value for each transport channel that is dormant, which may be obtained as described below.

Figure 6:
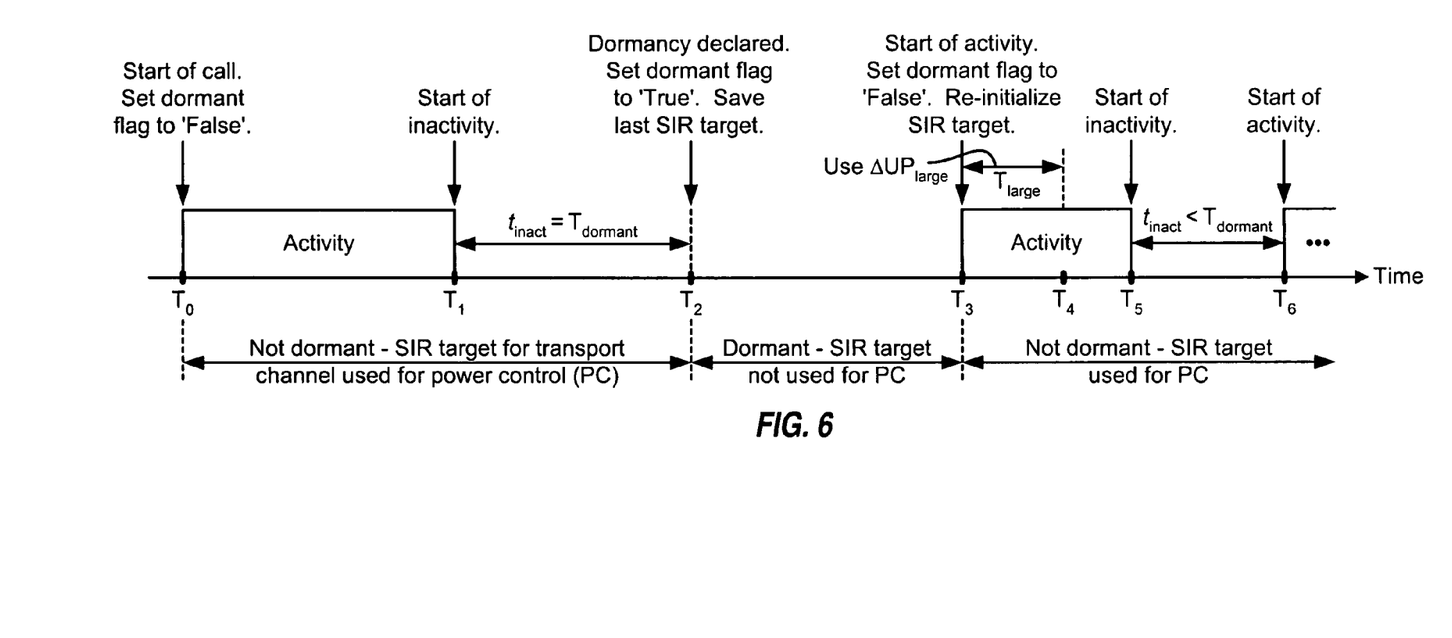
FIG. 6 shows a timeline of activity and processing for one transport channel.

FIG. 6 shows a timeline of activity and processing for one transport channel. At the start of a call at time $T_0$, the dormant flag for the transport channel is set to 'False', and the SIR target for the transport channel is initialized as described below. The SIR target for the transport channel is thereafter updated in each update interval and used to derive the final SIR target for the physical channel, as described above.

Inactivity on the transport channel starts at time $T_1$. At time $T_2$, the transport channel is declared to be dormant when the inactive time, $t_{inact}$, for the transport channel is equal to a dormant time threshold, $T_{dormant}$, used to detect for dormancy. The last SIR target value for the transport channel is determined and saved in table 500 at time $T_2$ when dormancy is declared. The SIR target for the transport channel is thereafter not used to determine the final SIR target, until activity is again detected on the transport channel. At time $T_3$, activity is detected on the transport channel, which then comes out of dormancy. The SIR target for the transport channel is re-initialized as described below. The SIR target for the transport channel is thereafter updated in each update interval and used to derive the final SIR target. Since the required SIR for the transport channel is not known after a period of no activity, a larger than normal up step, $\Delta UP_{large}$, may be used for the transport channel for a short time period, $T_{large}$, to ensure reliable reception of transport blocks on the transport channel. This short time period may be defined in units of time (e.g., a predetermined number of frames), by a predetermined number of good blocks received on the transport channel, and so on.

Inactivity on the transport channel starts again at time $T_5$, and activity restarts on the transport channel at time $T_6$. The transport channel is not declared to be dormant at any time between times $T_5$ and $T_6$ because the inactive time, $t_{inact}$, for the transport channel is less than the dormant time threshold, $T_{dormant}$.

Figure 7:
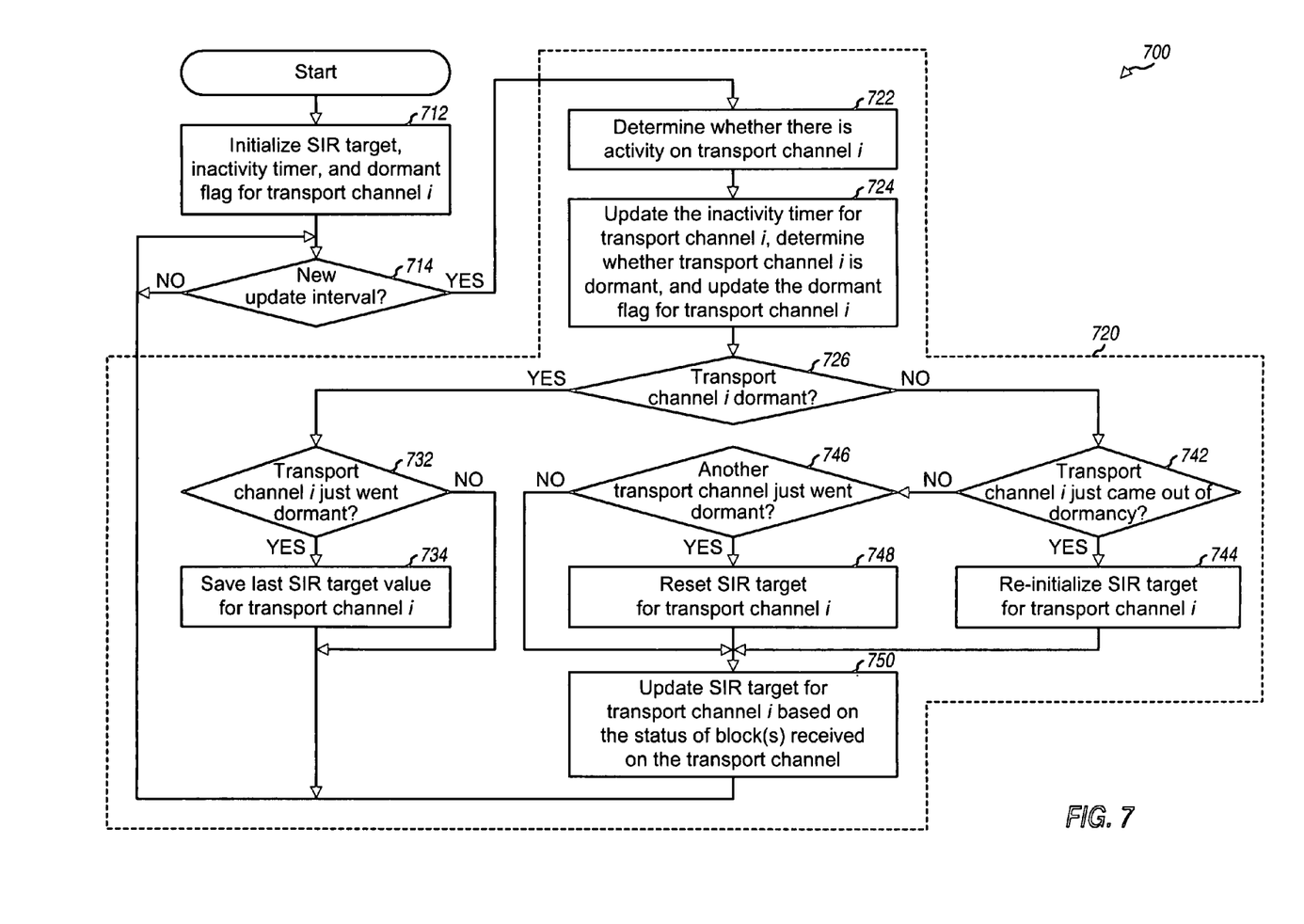
FIG. 7 shows a process to maintain the SIR target for one transport channel.

FIG. 7 shows a flow diagram of a process 700 to maintain the SIR target for one transport channel i. The SIR target, inactivity timer, and dormant flag for transport channel i are initialized at the start of a call (block 712). The SIR target may be initialized to a fixed value that may be configured at the wireless device or sent via over-the-air signaling. Alternatively, the SIR target may be initialized to a dynamic value that is determined based on various parameters for the channel configuration used for the call (e.g., the BLER targets for the transport channels, the slot format for the physical channel, and so on). The SIR target may also be initialized to a dynamic value determined based on an offset added to (1) an SIR target used in a recently concluded call, (2) an SIR target for another configuration used in the same call, and so on. The offset may be a function of various parameters for the channel configuration used for the call (e.g. the BLER targets, slot format, and so on). The inactivity timer may be (1) initialized to zero and thereafter incremented up or (2) initialized to the dormant time threshold, $T_{dormant}$, and thereafter decremented down. The dormant flag for transport channel i is initialized to 'False'.

For each update interval, as determined in block 714, appropriate processing is performed to determine whether there is activity on the transport channel in the current update interval (block 722). As noted above, activity may be detected based on CRC, transport format information, received block energy, and so on. The inactivity timer for transport channel i is updated based on the detected activity or inactivity on the transport channel (block 724). For example, the inactivity timer may be incremented if a good block is not received on the transport channel in the current update interval and reset if a good block is received. The dormancy state of transport channel i is determined based on the inactivity timer, and the dormant flag for transport channel i is updated accordingly (also in block 724). Transport channel i may be deemed dormant and its dormant flag may be set to 'True' if the inactivity timer is equal to or greater than the dormant time threshold, $T_{dormant}$.

A determination is then made whether transport channel i is dormant or not dormant (whether the dormant flag is set to 'True' or 'False') (block 726). If transport channel i is dormant, then a determination is made whether transport channel i has just gone dormant in the current update interval (e.g., $t_{inact}=T_{dormant}$) (block 732). If this is the case, then the last SIR target value for transport channel i is determined and saved, as described below (block 734). The process then returns to block 714.

If transport channel i is not dormant, as determined in block 726, then a determination is made whether transport channel i has just come out of dormancy (block 742). If the answer is 'yes', then the SIR target for transport channel i is "re-initialized" as described below (block 744). Otherwise, a determination is made whether another transport channel has just gone dormant in the current update interval (block 746). If the answer is 'yes', then the SIR target for transport channel i may be "reset" as described below (block 748). If the answer is 'no' for block 746 and also after blocks 744 and 748, the SIR target for transport channel i is updated based on the status of block(s) received on the transport channel in the current update interval (block 750). The process then returns to block 714. Blocks 734, 744, 748 and 750 are described in further detail below.

For block 734, the last SIR target value for transport channel i is determined and saved when dormancy is first declared for the transport channel. In one embodiment, the last SIR target value is set to the final SIR target for transport channel i, as follows:

$$SIR_{last\_target,\ i}=SIR_{target,\ i}(k_d), \qquad \text{Eq (5)}$$

where $k_d$ is the update interval in which transport channel i goes dormant. In another embodiment, the last SIR target value is set to the higher of the final SIR target and the SIR target for transport channel i, as follows:

$$SIR_{last\_target,\ i}=\text{Max }\{SIR_{final\_target}(k_d), SIR_{target,\ i}(k_d)\}, \qquad \text{Eq (6)}$$

where $SIR_{final\_target}(k_d)$ is the final SIR target for update interval $k_d$.

For block 744, the SIR target for transport channel i is re-initialized when transport channel i comes out of dormancy. In one embodiment, the SIR target is re-initialized to the last SIR target value, as follows:

$$SIR_{target,\,i}(k_a) = SIR_{last\_target,\,i}, \qquad \text{Eq (7)}$$

where $k_a$ is the update interval in which transport channel i comes out of dormancy. This embodiment sets the SIR target for transport channel i to the last known good SIR target value, which may be a good estimate of the required SIR for transport channel i. In another embodiment, the SIR target for transport channel i is re-initialized to the higher of the last SIR target value for transport channel i and the final SIR target for the physical channel, as follows:

$$SIR_{target,\,i}(k_a) = \text{Max}\,\{SIR_{last\_target,\,i},\,SIR_{final\_target}(k_a)\}. \qquad \text{Eq (8)}$$

If the last SIR target value is less than the current final SIR target, then re-initializing the SIR target for transport channel i to the higher current final SIR target reduces the likelihood of receiving erased blocks on transport channel i while not consuming any additional transmit power. In yet another embodiment, the SIR target for transport channel i is re-initialized to the initial SIR target value used for the transport channel at the start of the call. The last SIR target value does not need to be saved for this embodiment. In yet another embodiment, the SIR target is re-initialized to the value obtained from either equation (7) or (8) plus an offset.

For block 748, the SIR target for transport channel i may be reset whenever another transport channel j goes dormant. If transport channel j had the highest SIR target among all of the non-dormant transport channels in the current update interval, then the final SIR target is set to the SIR target for transport channel j. The performance of transport channel i is then effectively determined by the SIR target for transport channel j. If transport channel j is now dormant and removed from set J, then the final SIR target may drop abruptly if the SIR target for transport channel j is no longer considered in deriving the final SIR target. Consequently, the performance of transport channel i and other non-dormant transport channels may suffer. In one embodiment, the SIR target for transport channel i is reset to the final SIR target for the current update interval if another transport channel j goes dormant in the update interval. This ensures that the final SIR target will not drop abruptly because a transport channel has become dormant. In another embodiment, the SIR target for transport channel i is only reset to the final SIR target if the transport channel with the highest SIR target goes dormant.

For block 750, the SIR target for transport channel i is updated based on the status of the receive block(s) for transport channel i. The SIR target may be increased if at least one erased block is received on transport channel i, as shown in equation (2), or decreased if at least one good block and no erased blocks are received on transport channel i, as shown in equation (3). In an embodiment, the larger up step $\Delta UP_{large}$ is used for a time period of $T_{large}$ starting from when transport channel i first comes out of dormancy, as shown in FIG. 6. The SIR target for transport channel i is thus increased by the larger up step $\Delta UP_{large}$ if an erased block is received on transport channel i within this time period. Since the required SIR for transport channel i is not known after a period of no activity, the larger up step $\Delta UP_{large}$ ensures that the SIR target for transport channel i can be quickly adjusted to the required SIR. The larger up step size may be set, for example, to two times or three times the normal up step size, or $\Delta UP_{large} = 2 \cdot \Delta UP$ or $3 \cdot \Delta UP$. The time period $T_{large}$ may be selected to cover a predetermined number of TTIs or a predetermined number of transport blocks for transport channel i.

Figure 8:
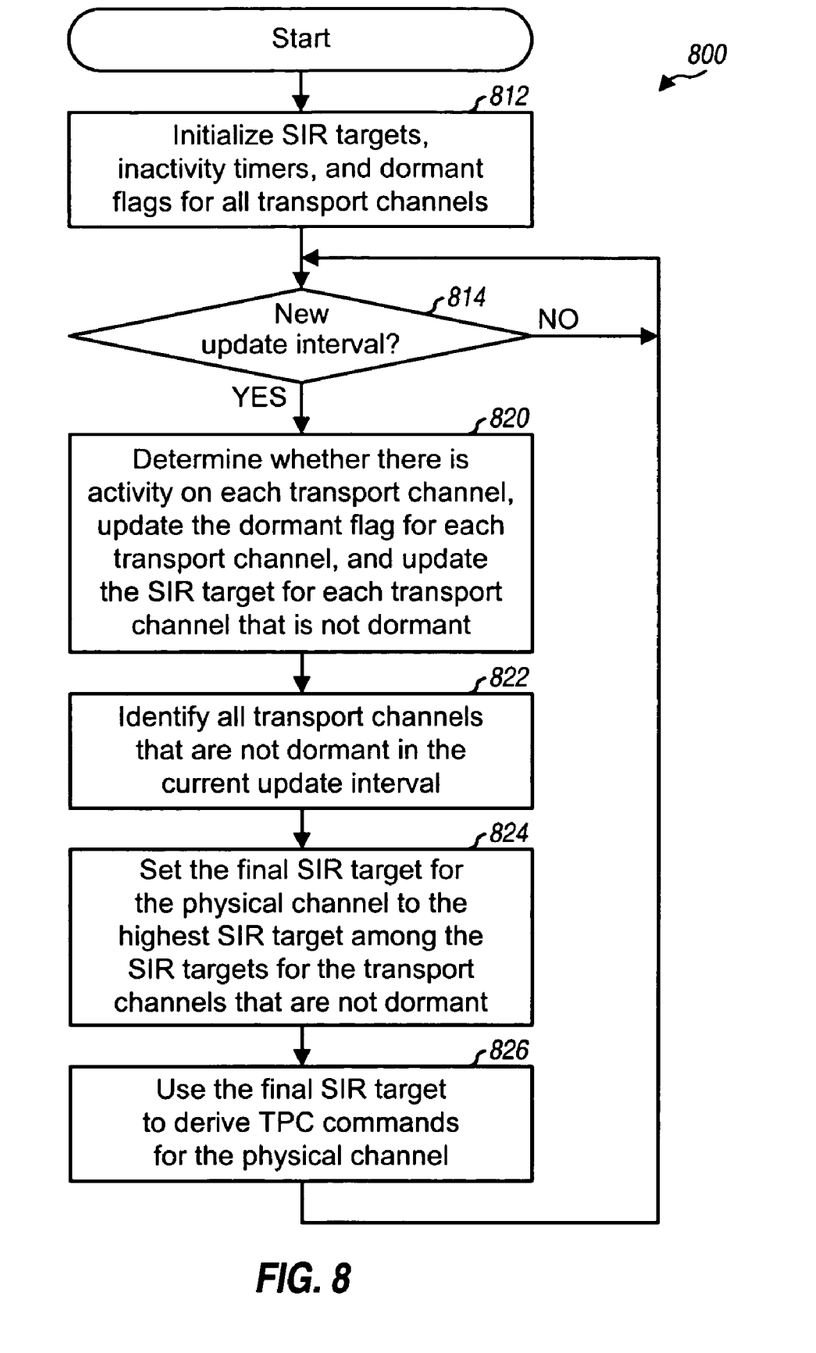
FIG. 8 shows a process to derive the final SIR target for the physical channel.

FIG. 8 shows a flow diagram of a process 800 to derive the final SIR target for the physical channel. The SIR targets, inactivity timers, and dormant flags for all transport channels carried by the physical channel are initialized at the start of the call (block 812). This may be performed as described above for block 712.

For each update interval, as determined in block 814, processing is performed to determine whether there was activity on each transport channel carried by the physical channel (block 820). The dormant flag for each transport channel is updated accordingly, and the SIR target for each non-dormant transport channel is also updated based on the status of block(s) received on the transport channel (also block 820). The processing for each transport channel in block 820 may be performed as described above for block 720. Block 820 updates the dormant flags for all transport channels and further updates the SIR targets for all non-dormant transport channels carried by the physical channel.

All transport channels that are not dormant in the current update interval are identified, e.g., based on the dormant flags (block 822). The final SIR target is then set equal to the highest SIR target among the SIR targets for all non-dormant transport channels (block 824). If all transport channels carried by the physical channel are dormant, then the final SIR target may be (1) maintained at the same value as for the prior update interval, (2) set to the initial final SIR target value, which is the value obtained at the start of the call based on the initial SIR targets for the transport channels, or (3) set to a minimum value, which may be the lowest SIR target among the last SIR targets for all transport channels or some other value. The final SIR target is used to derive TPC commands for the current update interval, as described above for FIG. 4 (block 826). The process then returns to block 814.

The updating of the SIR targets for the transport channels and the updating of the final SIR target for the physical channel may be performed in various manners and in different chronological orders. In one embodiment, the processing for each update interval is performed as follows: (1) all transport channels are processed, (2) the dormant state of each transport channel is determined, (3) the SIR targets for the transport channels are re-initialized, reset, and/or updated as applicable, (4) the final SIR target is derived, and (5) the last SIR target value is determined and saved for each transport channel that just went dormant. In another embodiment, for each update interval, the N transport channels are cycled through and one transport channel is processed at a time. For each transport channel, the SIR target for the transport channel is re-initialized, reset, and/or updated as applicable, and the final SIR target for the physical channel is derived with the SIR targets for the non-dormant transport channels at that time. This embodiment may simplify the updating of the SIR targets. However, the SIR targets for the transport channels and the final SIR target for the physical channel may be dependent on the order in which the transport channels are processed. Furthermore, the SIR target for a given transport channel i may be updated multiple times within the same update interval. For example, transport channel i may be processed first and its SIR target adjusted, then another transport channel j may be processed next and determined to have just become dormant, which may then cause the SIR target for transport channel i to be reset. The SIR targets may also be updated in other manners, and this is within the scope of the invention.

For clarity, a specific embodiment has been described above for taking into account intermittently active transport channels in deriving the final SIR target for the physical channel. This embodiment determines whether each transport channel is dormant or not (based on whether the inactive time for the transport channel exceeds the dormant time threshold) and completely removes the transport channel from consideration if it is deemed to be dormant. In another embodiment, a transport channel influences the final SIR target in different manners depending on the amount of time since last activity. For example, the SIR target for transport channel i may be (1) updated in the normal manner and considered for the final SIR target if $t_{inact} \leq T_{dormant,\ 1}$, (2) updated in a modified manner and considered for the final SIR target if $T_{dormant,\ 1} < t_{inact} \leq T_{dormant,\ 2}$, and (3) not considered for the final SIR target if $t_{inact} \geq T_{dormant,\ 2}$, where $T_{dormant,\ 1} < T_{dormant,\ 2}$. The modified manner may mean, for example, treating DTX blocks as good blocks and decreasing the SIR target for transport channel i by the down step size $\Delta DN_i$ for each DTX block received on the transport channel.

For clarity, a specific embodiment has also been described for deriving the final SIR target for the physical channel. This embodiment maintains a separate SIR target for each non-dormant transport channel and uses the SIR targets for all non-dormant transport channels to derive the final SIR target. The final SIR target may also be derived in other manners while taking into account intermittently active transport channels. In another embodiment, which is briefly noted above, one overall SIR target is maintained for the physical channel and is adjusted based on the status of blocks received on non-dormant transport channels. For each update interval, this overall SIR target may be (1) increased by the up step size $\Delta UP$ for each erased block received on any transport channel in the update interval and (2) if no erased blocks are received on any transport channel, decreased by the down step size $\Delta DN$ for each good block received in the update interval. For each update interval with at least one erased block, the down step size $\Delta DN$ may be set to the smallest down step size among the down step sizes for all transport channels with erased blocks. This embodiment effectively sets the SIR target for each non-dormant transport channel to the final SIR target at the end of each update interval. The final SIR target may also be derived in other manners, and this is within the scope of the invention.

Figure 9:
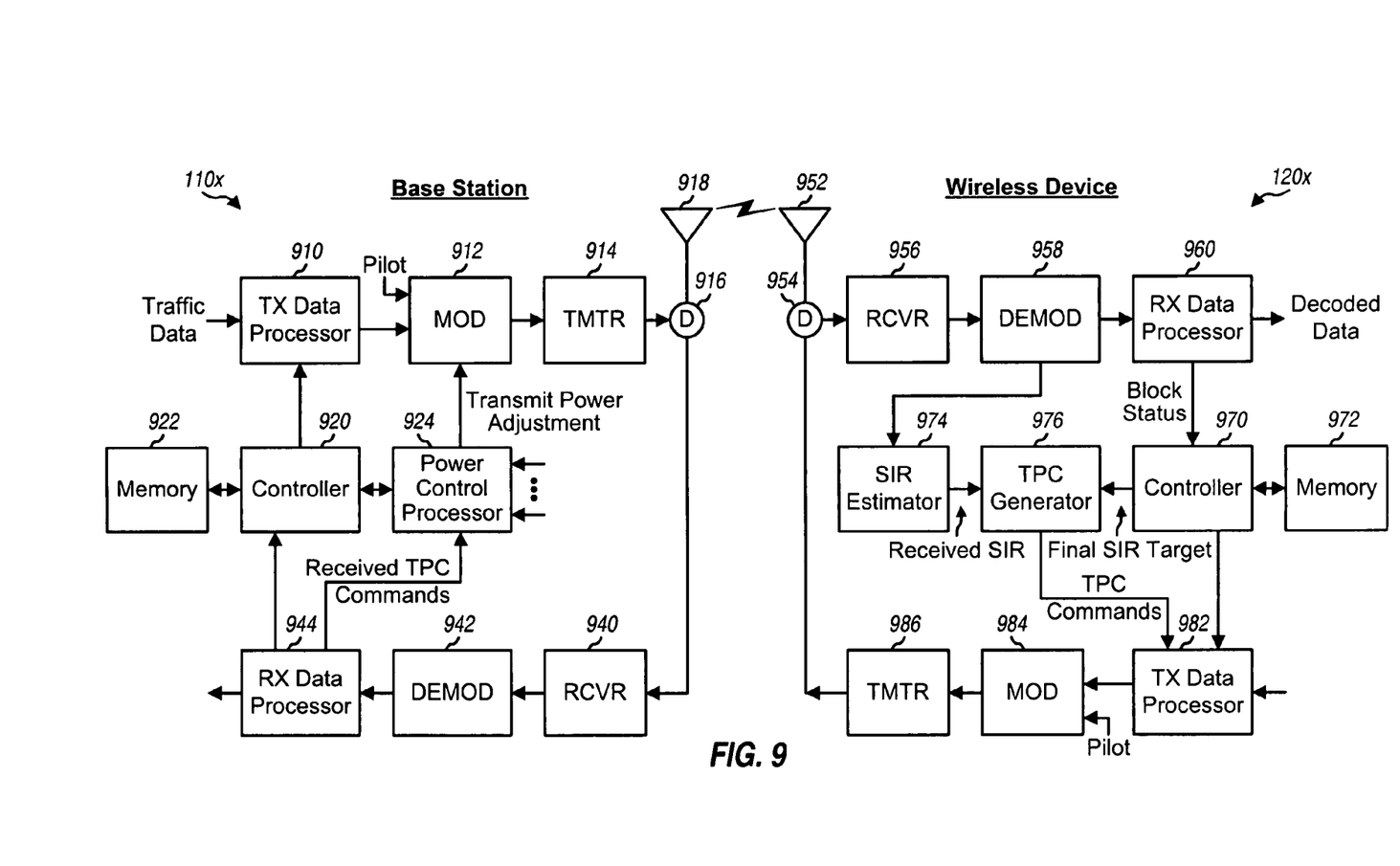
FIG. 9 shows a block diagram of a base station and a wireless device.

FIG. 9 shows a block diagram of an embodiment of a base station 110x and a wireless device 120x. Base station 110x is one of the base stations in FIG. 1, and wireless device 120x is one of the wireless devices in FIG. 1.

On the downlink, a transmit (TX) data processor 910 receives traffic data for one or more transport channels, partitions the traffic data for each transport channel into transport blocks, codes and interleaves each transport block in accordance with the transport format applicable for that transport block, and provides transport channel data for all active transport channels. A modulator (MOD) 912 processes the transport channel data and control data and provides a sequence of complex-valued chips. For W-CDMA, the processing by modulator 912 includes (1) multiplexing transport channel data with control data (as shown in FIG. 3) for each physical channel used for downlink transmission, (2) channelizing (or "spreading") the data for each physical channel with an orthogonal variable spreading factor (OVSF) code assigned to the physical channel, (3) scaling the channelized data for each physical channel based on a transmit power adjustment control for that physical channel, (4) combining the scaled data for all physical channels, and (5) spectrally spreading (or "scrambling") the combined data with a scrambling sequence assigned to base station 110x to obtain the sequence of chips. A transmitter unit (TMTR) 914 conditions (e.g., converts to analog, amplifies, filters, and frequency upconverts) the sequence of chips to generate a downlink signal. The downlink signal is routed through a duplexer (D) 916 and transmitted via an antenna 918 to the wireless devices.

At wireless device 120x, the downlink signal from base station 110x is received by an antenna 952, routed through a duplexer 954, and provided to a receiver unit (RCVR) 956. Receiver unit 956 conditions (e.g., filters, amplifies, and frequency downconverts) the received signal and further digitizes the conditioned signal to obtain a stream of data samples. A demodulator (DEMOD) 958, which may be implemented with a rake receiver, processes the data samples to obtain data symbol estimates. For W-CDMA, the processing by demodulator 958 includes (1) descrambling the data samples with a descrambling sequence for base station 110x, (2) dechannelizing the descrambled samples with OVSF codes to segregate the received data onto their respective physical channels, and (3) coherently demodulating the received data for each physical channel with pilot estimates to obtain the data symbol estimates. A receive (RX) data processor 960 then deinterleaves and decodes the data symbol estimates for each transport block sent to wireless device 120x to obtain decoded data for the transport block. RX data processor 960 further checks each decoded block and provides the status of the block (e.g., good, erased, or DTX) to a controller 970.

The processing for an uplink transmission may be performed similarly to that described above for the downlink. The downlink and uplink processing for W-CDMA is described in documents 3GPP TS 25.211, 25.212, 25.213, and 25.214, all of which are publicly available. The processing for downlink and uplink transmissions for other CDMA and TDMA systems is described in the applicable standards implemented by these systems.

For downlink power control, an SIR estimator 974 estimates the received SIR for each physical channel, e.g., based on pilot symbols received on the physical channel. Controller 970 may implement process 700 to update the SIR target for each transport channel and process 800 to derive the final SIR target for each physical channel used for downlink transmission. A TPC generator 976 receives the final SIR target for each physical channel from controller 970 and the received SIR for each physical channel from SIR estimator 974. TPC generator 976 generates TPC commands for each physical channel based on the received SIR and the final SIR target for that physical channel. The TPC commands are processed by a TX data processor 982, further processed by a modulator 984, conditioned by a transmitter unit 986, routed through duplexer 954, and transmitted via antenna 952 to base station 110x.

At base station 110x, the uplink signal from wireless device 120x is received by antenna 918, routed through duplexer 916, conditioned and digitized by a receiver unit 940, processed by a demodulator 942, and further processed by an RX data processor 944 to obtain received TPC commands. A power control processor 924 then detects the received TPC commands to obtain TPC decisions, which are used to derive the transmit power adjustment control for each physical channel. Modulator 912 receives the control and adjusts the transmit power for each downlink physical channel used for data transmission to wireless device 120x. Uplink power control may be achieved in a similar manner.

Controllers 920 and 970 direct the operations of various processing units within base station 110x and wireless device 120x, respectively. Controller 920 and 970 may also perform various functions for power control for the uplink and downlink. For example, each controller may implement the SIR estimator, TPC generator, and SIR target adjustment unit for its link. Memory units 922 and 972 store data and program codes for controllers 920 and 970, respectively.

For clarity, the power control techniques have been specifically described for the downlink in a W-CDMA system. As such, W-CDMA terminology (e.g., transport channel, transport block, frame, TTI, SIR target, and BLER target) is used for much of the description above. In general, these techniques may be used for other CDMA systems and other types of wireless communication systems that perform closed-loop power control for a data transmission sent on multiple data channels that may be intermittently active. The data channels are power controlled together. The data unit may be transport block, data block, packet, data frame, and so on, and may be transmitted over any time duration. The signal quality (SIR) may be quantified by signal-to-noise ratio, signal-to-interference ratio, signal-to-noise-and-interference ratio, received signal strength, pilot strength, and so on. Data transmission performance or quality may be quantified by BLER, frame error rate (FER), packet error rate (PER), bit error rate (BER), and so on.

The power control techniques described herein may be implemented by various means. For example, these techniques may be implemented in hardware, software, or a combination thereof. For a hardware implementation, the processing units used for power control at a receiver (e.g., RX data processor 960, controller 970, SIR estimator 974, and TPC generator 976 in FIG. 9) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The processing units used for power control at a transmitter (e.g., modulator 912 and power control processor 924 in FIG. 9) may also be implemented within one or more ASICs, PLDs, FPGAs, and so on.

For a software implementation, the power control techniques may be implemented with modules (e.g., procedures, functions, and so on) that perform the functions described herein. The software codes may be stored in a memory unit (e.g., memory unit 972 in FIG. 9) and executed by a processor (e.g., controller 970). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless device in a wireless communication system, comprising:

a data processor operative to process received data blocks for a plurality of data channels and to provide a status of each received data block, wherein the plurality of data channels are used for a data transmission and are power controlled together; and a controller operative to determine whether each of the plurality of data channels is dormant or not dormant, to adjust a final signal quality (SIR) target for the plurality of data channels based on status of received data blocks for data channels that are not dormant, and to use the final SIR target for power control of the data transmission sent on the plurality of data channels and, for each of the plurality of data channels, to determine an amount of time elapse since activity was last detected on the data channel, to declare the data channel to be dormant if the amount of elapsed time since last activity is greater than or equal to a predetermined time threshold, and to declare the data channel to be not dormant if the amount of elapsed time since last activity is less than the predetermined time threshold.

2. The wireless device of claim 1 wherein the controller is further operative to maintain an inactivity timer and a dormant flag for each of the plurality of data channels, the inactivity timer indicating the amount of elapsed time since activity was last detected on the data channel, and the dormant flag indicating whether the data channel is dormant or not dormant.

3. The wireless device of claim 1, wherein the controller is operative to detect for activity on each of the plurality of data channels based on an error detection code applied to each data block sent on the data channel.

4. The wireless device of claim 1, wherein the controller is operative to detect for activity on each of the plurality of data channels based on received signaling information indicating whether or not data blocks are sent on the data channel.

5. The wireless device of claim 1, wherein the controller is operative to detect for activity on each of the plurality of data channels based on energy of received data blocks for the data channel.

6. A wireless device in a wireless communication system, comprising:

data processor operative to process received data blocks for a plurality of data channels and to provided a status of each received data block, wherein the plurality of data channels are used for a data transmission and are power controlled together; and a controller operative to determine whether each of the plurality of data channels is dormant or not dormant, to maintain one signal quality (SIR) target for each data channel that is not dormant, to adjust the SIR target for each data channel that is not dormant based on status of received data blocks for the data channel, to derive a final SIR target for the plurality of data channels based on SIR targets for the data channels that are not dormant, and to use the final SIR target for power control of the data transmission sent on the plurality of data channels.

7. The wireless device of claim 6, wherein the controller is operative to set the final SIR target to a highest SIR target among the SIR targets for the data channels that are not dormant.

8. The wireless device of claim 6, wherein to adjust the SIR target for each data channel that is not dormant, the controller is operative to increase the SIR target for the data channel by an up step size for each erased block received on the data channel and to decrease the SIR target for the data channel by a down step size for each good block received on the data channel, a good block being a received data block that passes an error detection code, and an erased block being a received data block that is deemed to have been transmitted but fails the error detection code.

9. The wireless device of claim 6, wherein to adjust the SIR target for each data channel that is not dormant, the controller is operative to increase the SIR target for the data channel by an up step size for each time interval in which at least one erased block is received on the data channel and to decrease the SIR target for the data channel by a down step size for each time interval in which at least one good block and no erased blocks are received on the data channel, a good block being a received data block that passes an error detection code, and an erased block being a received data block that is deemed to have been transmitted but fails the error detection code.

10. The wireless device of claim 6, wherein the controller is further operative to, if a data channel is determined to have become dormant in a current update interval, set the SIR target for each data channel that is not dormant in the current update interval to the final SIR target for the current update interval.

11. The wireless device of claim 6, wherein the controller is operative to use a first up step size if an erased block is received on a data channel within a predetermined period after the data channel has transitioned from dormant to not dormant and to use a second up step size if an erased block is received on the data channel at other time, an erased block being a received data block that is deemed to have been transmitted but decoded in error, and wherein the first up step size is larger than the second up step size.

12. The wireless device of claim 11, wherein the predetermined period is defined by a predetermined number of units of time or a predetermined number of good blocks received on the data channel, a good block being a received data block that is decoded correctly.

13. The wireless device of claim 6, wherein the controller is further operative to, if a data channel is determined to have become dormant in a current update interval, save a last SIR target value for the data channel, the last SIR target value being an SIR target value usable for the data channel in the current update interval.

14. The wireless device of claim 6, wherein the controller is further operative to, if activity is detected on a data channel that was dormant, determine an initial SIR target value for the data channel, and to adjust the final SIR target further based on the initial SIR target value for the data channel.

15. The wireless device of claim 14, wherein the initial SIR target value is an SIR target value stored for the data channel at the time the data channel was determined to be dormant.

16. The wireless device of claim 14, wherein the initial SIR target value is a higher of the final SIR target for a current update interval and an SIR target value stored for the data channel at the time the data channel was determined to be dormant.

17. The wireless device of claim 6, wherein the controller is further operative to derive transmit power control (TPC) commands based on the final SIR target and a received SIR for the data transmission, and wherein the TPC commands are used to adjust transmit power for the data transmission sent on the plurality of data channels.

18. The wireless device of claim 6, wherein the wireless communication system is a Code Division Multiple Access (CDMA) system, and wherein the plurality of data channels are transport channels.

19. A wireless device in a wireless communication system, comprising:
 data processor operative to process received data blocks for a plurality of data channels and to provided a status of each received data block, wherein the plurality of data channels are used for a data transmission and are power controlled together; and
 a controller operative to determine whether each of the plurality of data channels is dormant or not dormant, to adjust a final signal quality (SIR) target for the plurality of data channels based on status of received data blocks for data channels that are not dormant, to increase the final SIR target in each update interval in which at least one erased block is received in the update interval, an erased block being a received data block that is deemed to have been transmitted but decoded in error, to decrease the final SIR target in each update interval in which good blocks and no erased blocks are received in the update interval, a good block being a received data block that is decoded correctly, and to use the final SIR target for power control of the data transmission sent on the plurality of data channels.

20. The wireless device of claim 19, wherein the controller is further operative to select a down step size, used to decrease the final SIR target, based on the status of the received data blocks for the data channels that are not dormant.

21. An apparatus in a wireless communication system, comprising:
 means for determining whether each of a plurality of data channels is dormant or not dormant, wherein the plurality of data channels are used for a data transmission and are power controlled together;
 means for adjusting a final signal quality (SIR) target for the plurality of data channels based on status of received data blocks for data channels that are not dormant, the final SIR target being increased in each update interval in which at least one erased block is received and decreased in each update interval in which good blocks and no erased blocks are received, a good block being a received data block that is decoded correctly, and an erased block being a received data block that is deemed to have been transmitted but decoded in error; and
 means for using the final SIR target for power control of the data transmission sent on the plurality of data channels.

22. An apparatus in a wireless communication system, comprising:
 means for determining whether each of a plurality of data channels is dormant or not dormant, wherein the plurality of data channels are used for a data transmission and are power controlled together;
 means for adjusting a final signal quality (SIR) target for the plurality of data channels based on status of received data blocks for data channels that are not dormant; and
 means for using the final SIR target for power control of the data transmission sent on the plurality of data channels, wherein the means for determining whether each of the plurality of data channels is dormant or not dormant comprises means for determining an amount of time elapsed since activity was last detected on the data channel, means for declaring the data channel to be dormant if the amount of elapsed time since last activity on the data channel is greater than or equal to a predetermined time threshold, and means for declaring the data channel to be not dormant if the amount of elapsed time since last activity on the data channel is less than the predetermined time threshold.

23. The apparatus of claim 22, wherein the means for determining whether each of the plurality of data channels is dormant or not dormant comprises means for detecting for activity on each of the plurality of data channels based on an error detection code, received signaling information, received data block energy, or a combination thereof.

24. An apparatus in a wireless communication system, comprising:

means for determining whether each of a plurality of data channels is dormant or not dormant, wherein the plurality of data channels are used for a data transmission and are power controlled together;

means for adjusting a signal quality (SIR) target for each data channels that is not dormant based on status of received data blocks for the data channel, wherein one SIR target is maintained for each data channel that is not dormant;

means for deriving a final SIR target for the plurality of data channels based on SIR targets for the data channels that are not dormant; and means for deriving a final SIR target for power control of the data transmission sent on the plurality of data channels.

25. A processor readable media for storing instructions operable in a wireless device to:

determine whether each of a plurality of data channels is dormant or not dormant, wherein the plurality of data channels are used for a data transmission and are power controlled together;

adjust a signal quality (SIR) target for each data channel that is not dormant based on status of received data blocks for the data channel, wherein one SIR target is maintained for each data channel that is not dormant;

derive a final SIR target for the plurality of data channels based on SIR targets for data channels that are not dormant; and use the final SIR target for power control of the data transmission sent on the plurality of data channels.

26. A method of performing power control for a data transmission in a wireless communication system, comprising:

determining whether each of a plurality of data channels is dormant or not dormant, wherein the plurality of data channels are used for the data transmission and are power controlled together;

adjusting a final signal quality (SIR) target for the plurality of data channels based on status of received data blocks for data channels that are not dormant, the final SIR target being increased in each update interval in which at least one erased block is received and decreased in each update interval in which good blocks and no erased blocks are received, a good block being a received data block that is decoded correctly, and an erased block being a received data block that is deemed to have been transmitted but decoded in error; and using the final SIR target for power control of the data transmission sent on the plurality of data channels.

27. A method of performing power control for a data transmission in a wireless communication system, comprising:

determining whether each of a plurality of data channels is dormant or not dormant, wherein the plurality of data channels are used for the data transmission and are power controlled together;

adjusting a final signal quality (SIR) target for the plurality of data channels based on status of received data blocks for data channels that are not dormant; and using the final SIR target for power control of the data transmission sent on the plurality of data channels, wherein the determining whether each of a plurality of data channels is dormant or not dormant comprises, for each data channel, determining an amount of time elapsed since activity was last detected on the data channel, declaring the data channel to be dormant if the amount of elapsed time since last activity is greater than or equal to a predetermined time threshold, and declaring the data channel to be not dormant if the amount of elapsed time since last activity is less than the predetermined time threshold.

28. A method of performing power control for a data transmission in a wireless communication system, comprising:

determining whether each of a plurality of data channels is dormant or not dormant, wherein the plurality of data channels are used for the data transmission and are power controlled together;

adjusting a signal quality (SIR) target for each data channel that are not dormant based on status of receiving data blocks for the data channel, wherein one SIR target is maintained for each data channel that is not dormant;

deriving a final SIR target for the plurality of data channels based on SIR targets for the data channels that are not dormant; and using the final SIR target for power control of the data transmission sent on the plurality of data channels.

* * * * *